United States Patent
Dargude et al.

(10) Patent No.: US 11,070,560 B1
(45) Date of Patent: Jul. 20, 2021

(54) SYSTEMS AND METHODS FOR MANAGING USER ENTITLEMENTS OF OBJECTS FROM HETEROGENEOUS CONTENT SOURCES

(71) Applicant: Veritas Technologies LLC, Santa Clara, CA (US)

(72) Inventors: Shailesh Dargude, Santa Clara, CA (US); Satish Grandhi, Santa Clara, CA (US); Srinivas Kavuri, Santa Clara, CA (US)

(73) Assignee: Veritas Technologies LLC, Santa Clara, CA (US)

( * ) Notice: Subject to any disclaimer, the term of this patent is extended or adjusted under 35 U.S.C. 154(b) by 163 days.

(21) Appl. No.: 16/374,409

(22) Filed: Apr. 3, 2019

Related U.S. Application Data

(60) Provisional application No. 62/653,541, filed on Apr. 5, 2018.

(51) Int. Cl.
   *H04L 29/06* (2006.01)
(52) U.S. Cl.
   CPC .......... *H04L 63/102* (2013.01); *H04L 63/101* (2013.01); *H04L 63/104* (2013.01)
(58) Field of Classification Search
   CPC .... H04L 63/102; H04L 63/104; H04L 63/101
   See application file for complete search history.

(56) References Cited

U.S. PATENT DOCUMENTS

| | | | |
|---|---|---|---|
| 2002/0152212 A1* | 10/2002 | Feldman | G06F 9/468 |
| 2005/0015621 A1* | 1/2005 | Ashley | H04L 63/083 |
| | | | 726/4 |
| 2008/0184336 A1* | 7/2008 | Sarukkai | G06F 21/6218 |
| | | | 726/1 |
| 2009/0150981 A1* | 6/2009 | Amies | H04L 67/02 |
| | | | 726/5 |
| 2015/0317339 A1* | 11/2015 | Vranyes | G06F 16/21 |
| | | | 707/695 |

OTHER PUBLICATIONS

Brownlee, Jason, "A Gentle Introduction to the Bag-of-Words Model", URL: https://machinelearningmastery.com/gentle-introduction-bag-words-model/, Machine Learning Mastery, Oct. 9, 2017, 24 pages.

(Continued)

*Primary Examiner* — Khoi V Le
(74) *Attorney, Agent, or Firm* — FisherBroyles, LLP

(57) ABSTRACT

The disclosed computer-implemented method for managing user entitlements of objects from heterogeneous content sources may include (i) obtaining a user identifier from a user profile associated with a user, (ii) determining an entitlement for the user in an access control list (ACL) for an object of a content source, (iii) determining another entitlement for the user in another ACL for another object of another content source, wherein the content source and the other content source are associated with different systems, (iv) generating an effective entitlement of the user by associating the user identifier, the entitlement for the user in the ACL for the object, and the other entitlement for the user in the other ACL for the other object, and (v) storing the effective entitlement of the user. Various other methods, systems, and computer-readable media are also disclosed.

19 Claims, 6 Drawing Sheets

(56) References Cited

OTHER PUBLICATIONS

Socher et al., "CS 2240: Deep Learning for NLP", URL: https://cs224d.stanford.edu/lecture_notes/notes1.pdf, Lecture Notes: Part 1, 2016, pp. 1-10.

Kasturi et al., "Systems and Methods for Data Management of Multiple Cloud Services", U.S. Appl. No. 16/375,243, filed Apr. 4, 2019, 69 pages.

Dargude et al., "Systems and Methods for Computing a Risk Score for Stored Information", U.S. Appl. No. 16/116,490, filed Aug. 29, 2018, 52 pages.

Veritas, "Veritas Information Map Installation and Administration Guide", URL: https://www.veritas.com/content/support/en US/doc/109835244-109835565-1, Jan. 30, 2018, 81 pages.

Dargude et al., "Systems and Methods for Prioritizing and Detecting File Datasets Based on Metadata", U.S. Appl. No. 16/374,568, filed Apr. 3, 2019, 43 pages.

Grandhi et al., "Systems and Methods for Generating Resource Definitions for Micro-Service-Based Platform-as-a-Service Architecture", U.S. Appl. No. 16/115,020, filed Aug. 28, 2018, 60 pages.

Dargude et al., "Systems and Methods for Normalizing Data Store Classification Information", U.S. Appl. No. 16/116,522, filed Aug. 29, 2018, 49 pages.

International Search Report and Written Opinion received for PCT Application Serial No. PCT/US2019/025801 dated Jul. 12, 2019, 10 pages.

Veritas, "Information Map Feature Briefing Veritas Information Map", URL: https://www.veritas.com/content/support/en US/doc/ka6j0000000L71WAAS, Jan. 1, 2016, 8 pages.

Veritas, "Information Map Whitepaper Security In-Depth", URL: https://www.veritas.com/content/support/en US/doc/ka6j0000000L8hfAAC, Jan. 1, 2017, 25 pages.

Veritas, "Veritas Information Map User Guide", URL: https://www.veritas.com/content/support/en US/doc/107111172-109780806-1, Nov. 21, 2017, 379 pages.

\* cited by examiner

SYSTEMS AND METHODS FOR MANAGING USER ENTITLEMENTS OF OBJECTS FROM HETEROGENEOUS CONTENT SOURCES

CROSS REFERENCE TO RELATED APPLICATION

This application claims the benefit of U.S. Provisional Application No. 62/653,541, filed Apr. 5, 2018, the disclosure of which is incorporated, in its entirety, by this reference.

BACKGROUND

An information object, such as an electronic document or multimedia file, stored on a content source (e.g., storage system, document management platform, collaborative platform, etc.) may be secured using an access control property known as an access control list. Different content sources may have different methodologies to assign permissions to interact with the information objects. In some examples, an owner of the information object may control a set of operation (e.g., read, write, etc.) for the information object. The set of operations may enable other users in the environment to interact with the information object.

In some examples, a user may gain access to an information object by having the access directly assigned by the owner of the information object or another user with the ability to assign access. In some examples, a user may gain access to an information object by inheriting the access through a parent information object or from membership in a user group that has been granted access rights.

In some examples, an organization may have a large number of users and user groups. The user groups may consist of users and/or other user groups. Determining permission rights of a user in an organization may be difficult because of the multiple permission models from the different content sources. Incorrect permissions on information objects may lead to security problems, which may result in loss of revenue or violations of compliance rules or other regulations. Difficulties in assessing the permissions of a user may result in accidental access of information objects by users. The instant disclosure, therefore, identifies and addresses a need for systems and methods for managing user entitlements of objects from heterogeneous content sources.

SUMMARY

As will be described in greater detail below, the instant disclosure describes various systems and methods for managing user entitlements of objects from heterogeneous content sources.

In one example, a method for managing user entitlements of objects from heterogeneous content sources may include (i) obtaining, by the computing device, a user identifier from a user profile associated with a user, (ii) determining an entitlement for the user in an access control list (ACL) for an object of a content source, (iii) determining another entitlement for the user in another ACL for another object of another content source, wherein the content source and the other content source are associated with different systems, (iv) generating an effective entitlement of the user by associating the user identifier, the entitlement for the user in the ACL for the object, and the other entitlement for the user in the other ACL for the other object, and (v) storing the effective entitlement of the user.

In some examples, the method may include (i) identifying a user group in the ACL, (ii) determining the user is a member of the user group in the ACL, and (iii) determining a group entitlement for the object in the ACL. Generating the effective entitlement of the user may include associating the user identifier with the group entitlement for the object. The method may include identifying a conflict between the entitlement for the user for the object and the group entitlement for the object and selecting, using a set of conflict resolution rules, the entitlement for the user for the object or the group entitlement for the object. The method may include detecting that the user has been removed from the user group and updating the effective entitlement of the user to remove the group entitlement. In some examples, the method may include detecting a change in the group entitlement and updating the effective entitlement of the user to include the change in the group entitlement.

In some examples, the method may include detecting a change of the entitlement for the user in in the ACL for the object and updating the effective entitlement of the user to include the change of the entitlement. In some examples, the entitlement for the user of the ACL for the object of the content source may be normalized to configured entitlements. The other entitlement for the user in the other ACL for the other object of the other content source may be normalized to the configured entitlements. In some examples, a security action may be performed using the effective entitlement of the user. The effective entitlement of the user may be used to generate a report.

In one example, a system for managing user entitlements of objects from heterogeneous content sources may include a computing device comprising at least one physical processor and physical memory comprising computer-executable instructions that, when executed by the at least one physical processor, may cause the computing device to (i) obtain a user identifier from a user profile associated with a user, (ii) determine an entitlement for the user in an ACL for an object of a content source, (iii) determine another entitlement for the user in another ACL for another object of another content source, wherein the content source and the other content source are associated with different systems, (iv) generate an effective entitlement of the user by associating the user identifier, the entitlement for the user in the ACL for the object, and the other entitlement for the user in the other ACL for the other object, and (v) store the effective entitlement of the user.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) obtain a user identifier from a user profile associated with a user, (ii) determine an entitlement for the user in an ACL for an object of a content source, (iii) determine another entitlement for the user in another ACL for another object of another content source, wherein the content source and the other content source are associated with different systems, (iv) generate an effective entitlement of the user by associating the user identifier, the entitlement for the user in the ACL for the object, and the other entitlement for the user in the other ACL for the other object, and (v) store the effective entitlement of the user.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
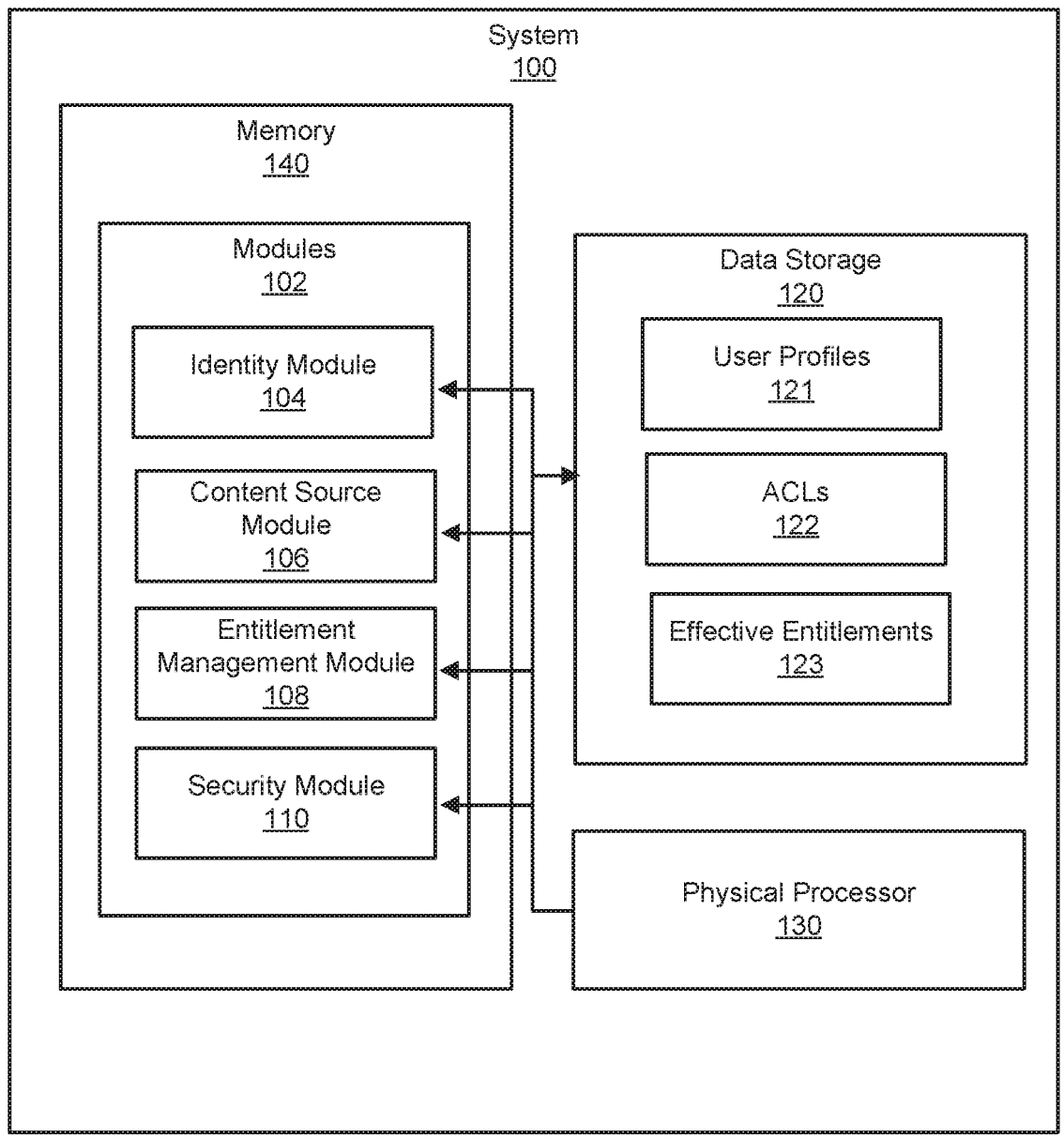
FIG. 1 is a block diagram of an example system for managing user entitlements of objects from heterogeneous content sources.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for managing user entitlements of objects from heterogeneous content sources. As will be described in greater detail below, the systems and methods described herein may determine effective entitlements for users and map permission models from various content sources to a unified entitlement model. The access control lists (ACLs) of information objects from different content sources may be processed by a computing device to identify users and user groups. The user groups may be deconstructed to identify members of the user groups. The entitlements of each of the users and user groups may be determined. The systems and methods described herein may determine effective entitlements of users by associating information from a user profile of a user to the different permissions identified from the processed ACLs. The effective entitlements may be normalized and stored. The effective entitlements may include permissions from different types of content sources, enabling a unified view of the entitlements across the different content sources.

Figure 2:
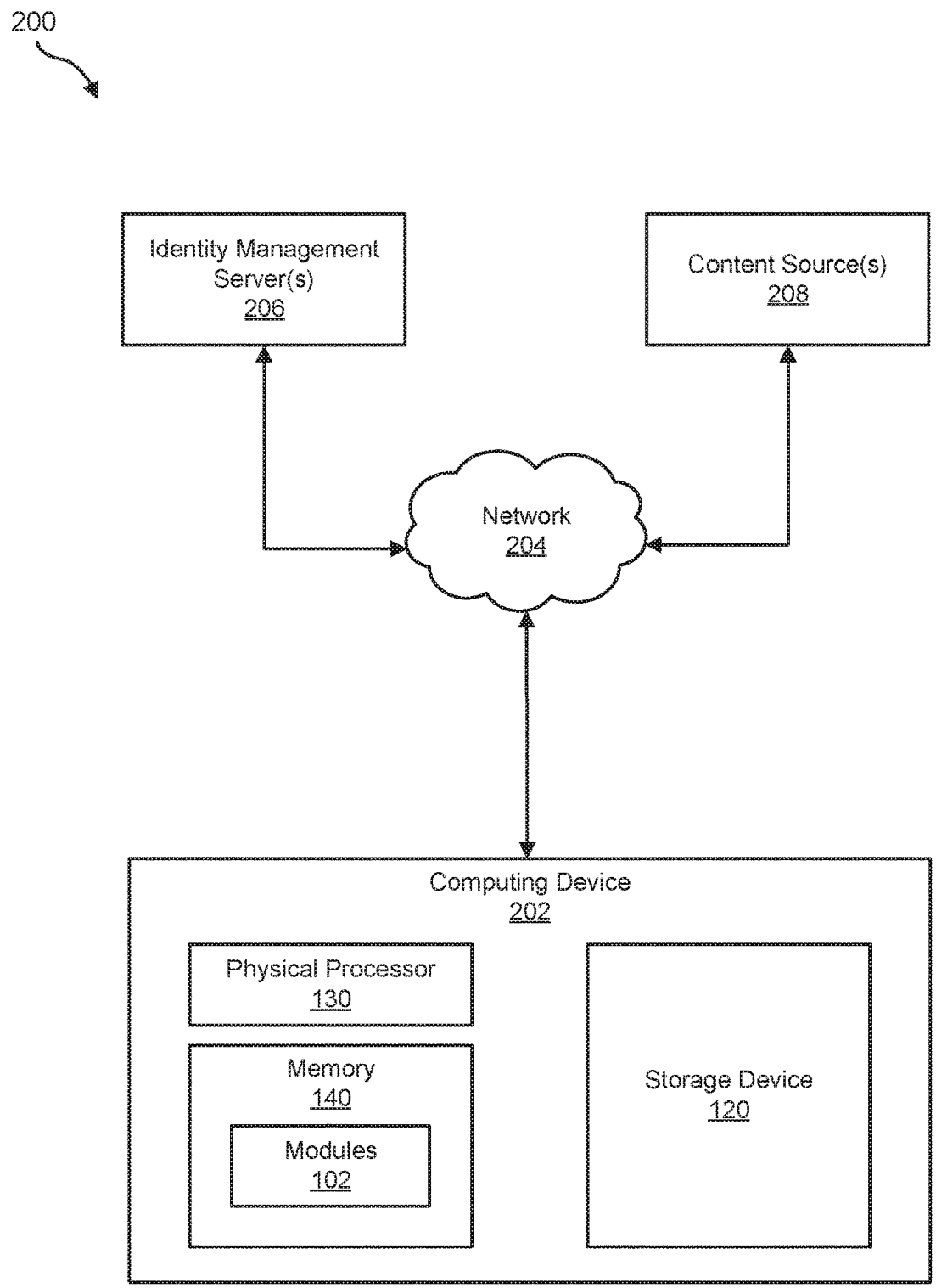
FIG. 2 is a block diagram of an additional example system for managing user entitlements of objects from heterogeneous content sources.

The following will provide, with reference to FIGS. 1-2, detailed descriptions of example systems for managing user entitlements of objects from heterogeneous content sources. Detailed descriptions of corresponding computer-implemented methods will also be provided in connection with FIG. 3. A detailed description of data flow through the example system for managing user entitlements of objects from heterogeneous content sources will also be provided in connection with FIG. 4. In addition, detailed descriptions of an example computing system and network architecture capable of implementing one or more of the embodiments described herein will be provided in connection with FIGS. 5-6, respectively.

FIG. 1 is a block diagram of an example system 100 for managing user entitlements of objects from heterogeneous content sources. As illustrated in this figure, the example system 100 may include one or more modules 102 for performing one or more tasks. As will be explained in greater detail below, the modules 102 may include an identity module 104, a content source module 106, an entitlement management module 108, and a security module 110. Although illustrated as separate elements, one or more of the modules 102 in FIG. 1 may represent portions of a single module or application.

In certain embodiments, one or more of the modules 102 in FIG. 1 may represent one or more software applications or programs that, when executed by a computing device, may cause the computing device to perform one or more tasks. For example, and as will be described in greater detail below, one or more of the modules 102 may represent modules stored and configured to run on one or more computing devices, such as the devices illustrated in FIG. 2 (e.g., computing device 202, identity management server 206, and/or content source 208). One or more of the modules 102 in FIG. 1 may also represent all or portions of one or more special-purpose computers configured to perform one or more tasks.

As illustrated in FIG. 1, the example system 100 may also include one or more memory devices, such as memory 140. The memory 140 generally represents any type or form of volatile or non-volatile storage device or medium capable of storing data and/or computer-readable instructions. In one example, the memory 140 may store, load, and/or maintain one or more of the modules 102. Examples of the memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As illustrated in FIG. 1, the example system 100 may also include one or more physical processors, such as physical processor 130. The physical processor 130 generally represents any type or form of hardware-implemented processing unit capable of interpreting and/or executing computer-readable instructions. In one example, the physical processor 130 may access and/or modify one or more of the modules 102 stored in the memory 140. Additionally, or alternatively, the physical processor 130 may execute one or more of the modules 102 to facilitate managing user entitlements of objects from heterogeneous content sources. Examples of the physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

As illustrated in FIG. 1, the example system 100 may also include data storage 120. The data storage 120 generally represents any type or form of computing device capable of data storage. In one example, the data storage 120 may store user profiles 121, ACLs 122, and/or effective entitlements 123.

The example system 100 in FIG. 1 may be implemented in a variety of ways. For example, all or a portion of the example system 100 may represent portions of example system 200 in FIG. 2. As shown in FIG. 2, the system 200 may include a computing device 202 in communication with an identity management server 206, and/or a content source 208 via a network 204. In one example, all or a portion of the functionality of the modules 102 may be performed by the computing device 202, the identity management server 206, the content source 208, and/or any other suitable computing system. As will be described in greater detail below, one or more of the modules 102 from FIG. 1 may, when executed by at least one processor of the computing device 202, the identity management server 206, and/or the content source 208, enable the computing device 202, the identity management server 206, and/or the content source 208, to manage user entitlements of objects from heterogeneous content sources. For example, and as will be described in greater detail below, one or more of the modules 102 may cause the computing device 202, the identity management server 206, and/or the content source 208, to manage effective entitlements of a user for objects from different content sources 208.

The computing device 202 generally represents any type or form of computing device capable of reading computer-executable instructions. For example, the computing device 202 may represent an endpoint device running client-side software, such as an application node. Additional examples of the computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, storage servers, database servers, application servers, and/or web servers configured to run certain software applications and/or provide various storage, database, and/or web services variations or combinations of one or more of the same, or any other suitable computing device.

The network 204 generally represents any medium or architecture capable of facilitating communication or data transfer. In one example, the network 204 may facilitate communication between the computing device 202, the identity management server 206, and/or the content source 208. In this example, the network 204 may facilitate communication or data transfer using wireless and/or wired connections. Examples of the network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, or any other suitable network.

The identity management server 206 generally represents any type or form of computing device capable of generate and managing data associated with a user, such as user profiles 121. For example, the identity management server 206 may represent a device running software to generate and manage user profiles 121. Additional examples of the identity management server 206 include, without limitation, laptops, tablets, desktops, servers, cellular phones, Personal Digital Assistants (PDAs), multimedia players, embedded systems, wearable devices (e.g., smart watches, smart glasses, etc.), smart vehicles, Internet-of-Things devices (e.g., smart appliances, etc.), gaming consoles, storage servers, database servers, application servers, and/or web servers configured to run certain software applications and/or provide various storage, database, and/or web services variations or combinations of one or more of the same, or any other suitable computing device.

The content source 208 generally represents any type or form of volatile or non-volatile storage device or medium capable of storing data and/or computer-readable instructions. In examples, content source 208 may facilitate a data storage system, document management platform, collaborative platform, or the like. Different content sources 208 may use different permission models. In some examples, the content source 208 may be located on-premise, a cloud resource, or the like. Examples of the content source 208 may include, without limitation, Random Access Memory (RAM), Read Only Memory (ROM), flash memory, Hard Disk Drives (HDDs), Solid-State Drives (SSDs), optical disk drives, caches, cloud-based storage devices, storage servers, database servers, application servers, and/or web servers configured to run certain software applications and/or provide various storage, database, and/or web services, variations or combinations of one or more of the same, and/or any other suitable storage memory.

Many other devices or subsystems may be connected to computing system 100 in FIG. 1 and/or computing system 200 in FIG. 2. Conversely, all of the components and devices illustrated in FIGS. 1 and 2 need not be present to practice the embodiments described and/or illustrated herein. The devices and subsystems referenced herein may also be interconnected in different ways from that shown in FIG. 2. Computing systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

Figure 3:
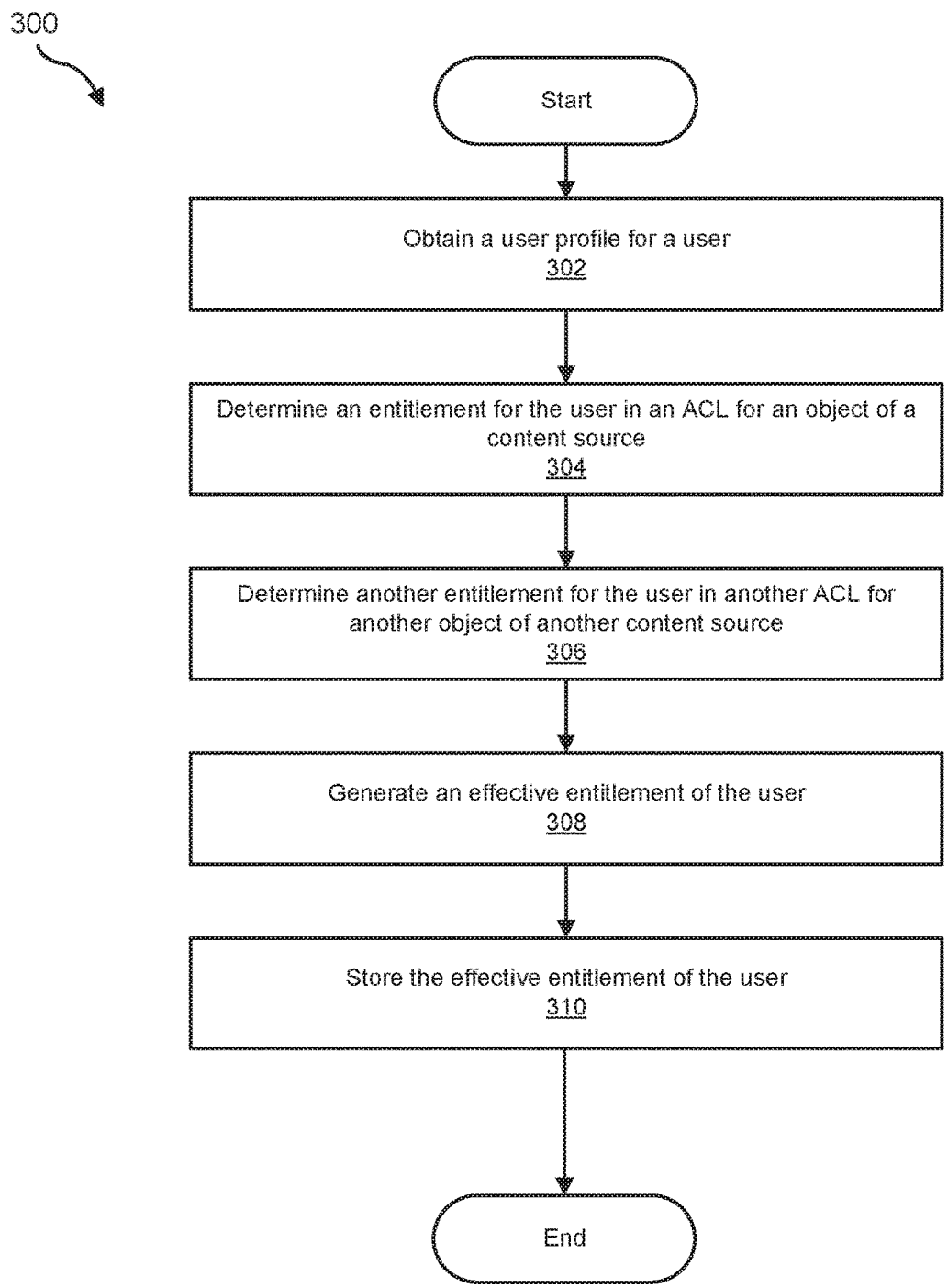
FIG. 3 is a flow diagram of an example method for managing user entitlements of objects from heterogeneous content sources.
Figure 4:
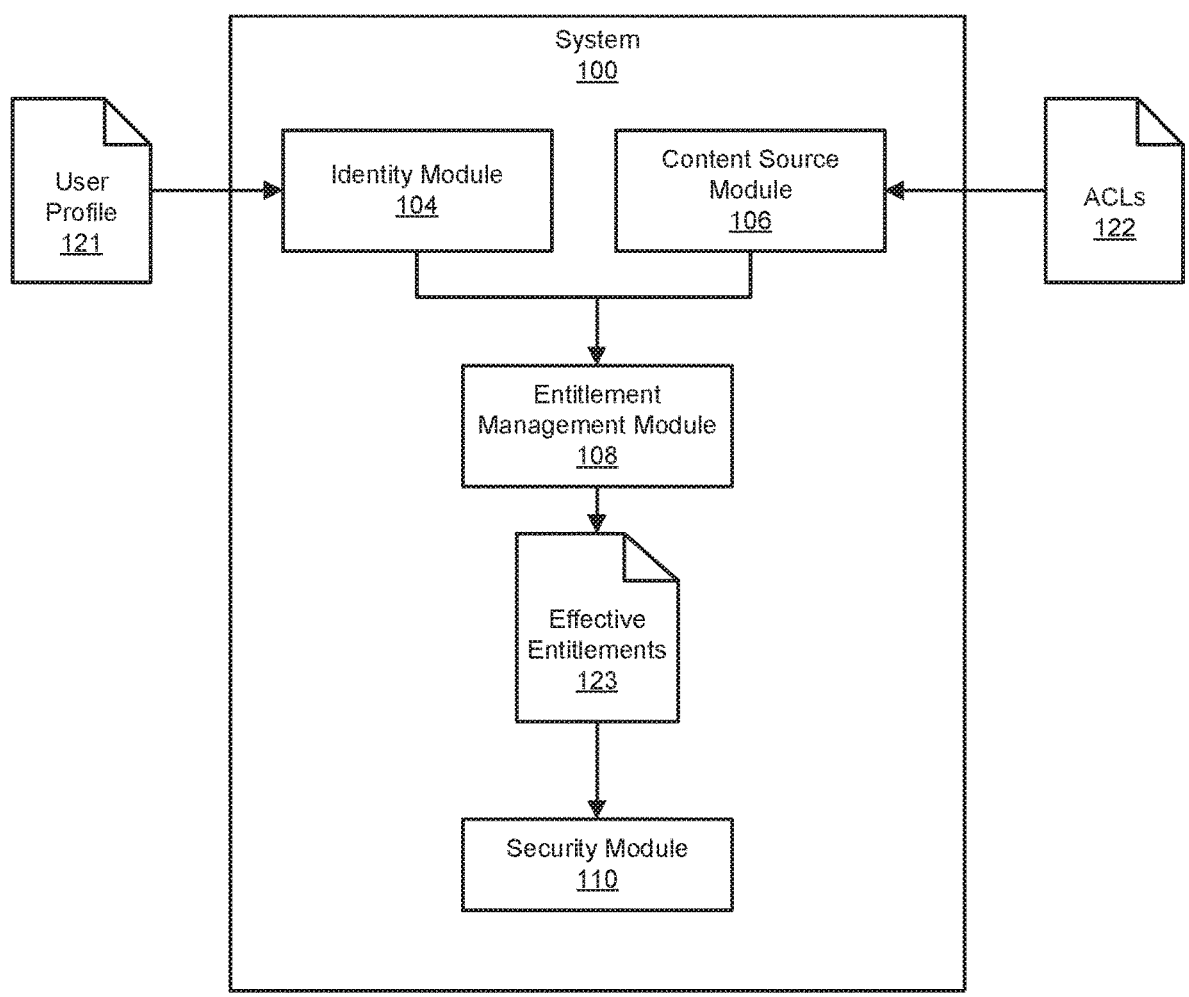
FIG. 4 is a data flow diagram of an example system for managing user entitlements of objects from heterogeneous content sources.

FIG. 3 is a flow diagram of an example computer-implemented method 300 for managing user entitlements of objects from heterogeneous content sources. The steps shown in FIG. 3 may be performed by any suitable computer-executable code and/or computing system, including the system 100 in FIG. 1, the system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may obtain a user profile for a user. In some examples, the user profile for the user may be obtained in any suitable manner. For example, the identity module 104 may, as part of computing device 202 in FIG. 2, obtain a user profile 121 for the user from an identity management server 206.

The term "user profile," as used herein, generally refers to data, such as personal data and settings, associated with an identified user and stored in a data structure. The user profile may include a unique identifier for the user, such as an email address or username. Personal data that may be included in the user profile may include the user's name, address, contact information (e.g., phone number, email addresses, messaging handle, etc.), position within an organization, hierarchical organization information (e.g., direct reports, supervisor, etc.), or the like. Settings may include information indicative of a user's preferences in a computing environment, past user behavior, and the like. User profile information may indicate default entitlement for information objects and membership in any user groups.

In some examples, the identity module 104 may obtain a user profile from the identity management server 206. The identity module 104 may process the user profile and identify a user identifier associated with the user. In some examples, the identity module 104 may generate a unique user identifier using data from the user profile. The identity module 104 may transmit the user identifier to the entitlement management module 108.

At step 304, one or more of the systems described herein may determine an entitlement for the user in an access control list for an object of a content source. The system may perform this step in any suitable manner. For example, the content source module 106 may obtain the ACL 122 for the object from the content source 208.

The term "object" or "information object" as used herein, generally refers to any electronic media content. The information object may be generated and manipulated by different programs, such as word processors, spreadsheets, graphics software, and the like. The information objects may be stored in content sources and may be associated with different permissions models designating different types of permitted interactions by users.

The term "content source," as used herein, generally refers to any type of data repository, data storage, document management platform, collaborative platform, or other similar platform where information objects may be stored and manipulated. Content sources may use different types of permission models that indicate the types of interactions permitted to a user.

The term "entitlement," as used herein, generally refers to a structured set of permissions for interacting with objects of content sources. Entitlements may be assigned directly to users by owners of objects or users of objects with appropriate permissions. In some examples, entitlements of objects for a user may be inherited from parent objects or from memberships in user groups. The entitlements of objects may be managed through an access control list or other similar entitlement management tool or system.

The term "access control list" or "ACL" as used herein, generally refers a list of entitlements to an object in a content source. In some examples, an ACL may specify which users or system processes are granted access to objects. ACLs may indicate what operations are allowed on the object. Examples of operations may include READ, WRITE, DELETE, or the like. An ACL may be stored with an object or embedded in the object.

In some examples, the content source module 106 may obtain one or more ACLs for objects from the content source 208. The content source module 106 may process the ACLs 122 to identify one or more users and their associated entitlements. In some examples, the processing of the ACLs 122 may trigger obtaining user profiles 121 from identity management servers 206.

In some examples, the content source module 106 may identify one or more user groups in the ACL 122. The content source module 106 may deconstruct the user group to identify the users that are members of the user group. The content source module 106 may also identify one or more group entitlements (e.g., entitlements that are granted to any member of the user group).

At step 306, one or more of the systems described herein may determine another entitlement for the user in another ACL for another object of another content source. The system may perform this step in any suitable manner. For example, the content source module 106 may obtain a different ACL 122 for a different object from another content source 208. In some examples, the content source in step 304 and step 306 are associated with different systems, which may use different permission models.

At step 308, one or more of the systems described herein may generate an effective entitlement of the user. The system may perform this step in any suitable manner. For example, the entitlement management module 108 may receive data from the identity module 104 and/or the content source module 106. The identity module 104 may provide a user identifier associated with the user. The content source module 106 may transmit the processed ACLs 122. The entitlement management module 108 may generate the effective entitlement 123 of the user by associating the user identifier, the entitlement for the user in the ACL 122 for the object (e.g., from step 304), and the other entitlement for the user in the other ACL 122 for the other object (e.g., from step 306).

The term "effective entitlement," as used herein, generally refers to entitlements for a user for an object of a content source derived from deconstructing user groups and resolving any conflicting entitlements associated with a user. Effective entitlements may enable entitlements for different objects from different content sources to be normalized and stored separately from the objects. The effective entitlements may be used to provide a unified view of entitlements for users across different content sources 208 in a system or environment.

In some examples, the entitlement management module 108 may associate the user identifier with a group entitlement for the object, as identified in either step 304 or 306 from the ACL 122 of the object. In some examples, the entitlement management module 108 may detect a conflict between the entitlements identified for the user. For example, conflicts may be between directly assigned entitlement for the user for an object and a group entitlement for the same object. In some examples, the entitlement management module 108 may resolve the conflict using a set of conflict resolution rules. For example, a rule may specify that directly assigned entitlements have higher priority than group entitlements, which would mean that the entitlement management module 108 would select the entitlement of the user over the group entitlement. Similarly, a rule may specify that group entitlements have a higher priority than individual entitlements, which would mean that the entitlement management module 108 may select the group entitlement over the individual entitlement of the user. In some examples, a user may be a member of multiple user groups, which may have conflicting entitlements for an object. The conflict resolution rules may indicate one or more factors that may be used to resolve the conflict, such as duration of membership of the user group, position in the user group, number of members in the user group, or the like.

In some examples, the entitlement management module 108 may normalize the entitlement for the user of the ACL for the object of the content source to a configured entitlement. Content sources 208 may use different permission models that may have different types of operations. The entitlement management module 108 may use a configured entitlement, based on settings received from an administrator of the system, to standardize entitlements across the different types of content sources 208 in a system. The configured entitlement may be applied by the entitlement management module 108 to each ACL 122 processed by the content source module 106, regardless of the type associated with the content source 208.

The effective entitlements 123 may be updated based on identified events. For example, the entitlement management module 108 may detect that a user has been removed from a user group. The entitlement management module 108 may update the effective entitlement 123 of the user to remove the group entitlement. In some examples, the entitlement management module 108 may detect a change in the group entitlement of an ACL 122. The entitlement management module 108 may update the effective entitlement 123 of the user to include the change in the group entitlement. Similarly, the entitlement management module 108 may detect a change of the entitlement of the user in the ACL 122 of an information object of a content source 208. The entitlement management module 108 may update the effective entitlement 123 of the user to include the change of the entitlement.

To further illustrate systems and methods described herein and in relation to FIG. 3, Table 1 and Table 2 have been included below. Table 1 is an example listing of users and user groups of a system. As shown in Table 1, users U1 and U3 are members of user group G1 and users U4 and U5 are members of G2. G3 includes G2, which includes users U4 and U5.

TABLE 1

Example Users and User Groups

| User/Group name | User/Group | Membership |
|---|---|---|
| U1 | User | |
| U2 | User | |
| U3 | User | |
| U4 | User | |
| U5 | User | |
| G1 | Group | U1, U3 |
| G2 | Group | U4, U5 |
| G3 | Group | G2 |

Table 2 is an example ACL for an information object in a content source 208. In some examples, the content source module 106 may obtain and process the example ACL 122 in Table 2. The content source module 106 may deconstruct each user group to identify the different users of each user group. For example, G1 may be deconstructed to identify users U1 and U3. G3 may be deconstructed to identify user group G2, which may be further deconstructed to identify user U4 and U5. The processed ACL 122 may be transmitted by the content source module 106 to the entitlement management module 108, which may generate an effective entitlement for the different users. Based on the information in Table and Table 2, the entitlement management module 108 may determine that the effective entitlement for user U1 may be READ ALLOW (direct entitlement) and WRITE DENY (inherited from user group membership in G1).

For user U3, the entitlement management module 108 may determine the effective entitlement to be WRITE ALLOW (direct entitlement) and WRITE DENY (inherited from user group membership in G1). Given that the entitlements are conflicting, the entitlement management module 108 may use a set of conflict resolution rules to determine which of the two entitlements to select to resolve the conflict.

TABLE 2

Example ACL

| Type | Access Mask | SID |
|---|---|---|
| ALLOW | READ | U1 |
| ALLOW | READ | U2 |
| ALLOW | WRITE | J3 |
| DENY | WRITE | G1 |
| ALLOW | READ | G3 |

At step 310, one or more of the systems described herein may store the effective entitlement of the user. The system may perform this step in any suitable manner. For example, the entitlement management module 108 may store the effective entitlement 123 of the user in the data storage 120 of the computing device 202. In some examples, the entitlement management module 108 may store the effective entitlement 123 of the user in a designated location, such as a remote server or the like.

The effective entitlement 123 of users may be used for different purposes. In some examples, the security module 110 may use the effective entitlement 123 to perform a security action. Examples of security actions may include modifying the effective entitlement 123, which may propagate the changes in entitlements to any affected ACLs. The security module 110 may generate reports using the effective entitlements 123 of users to provide a unified view of entitlements across different content sources 208.

The example system 100 in FIG. 1 may be implemented in a variety of ways. For example, all or a portion of the example system 100 may represent portions of the system 400 in FIG. 4. As will be described in greater detail below, one or more of the modules 102 from FIG. 1 may, when executed by at least one processor of the computing device 202, enable the system 400 to manage user entitlements of objects from heterogeneous content sources 208. For example, and as will be described in greater detail below, one or more of the modules 102 may cause the example system 400 to obtain, by the identity module 104, a user profile 121 associated with a user. The identity module 104 may process the user profile 121 and may obtain a user identifier for the user. The content source module 106 may receive an ACL 122 for an object from a content source 208. The content source module 106 may process the ACL 122 to identify user groups and deconstruct them into individual users. The content source module 106 may also determine entitlements associated with the individual users The entitlement management module 108 may receive the user identifier from the identity module 104 and the processed ACL 122 from the content source module 106. The entitlement management module 108 may generate an effective entitlement 123 for the user using the user identifier and mapping entitlements from the ACL 122 to the user identifier. For example, the entitlement management module 108 may generate the effective entitlement 123 by associating an entitlement for the user in the ACL 122 for the object from the content source 208 with the user identifier. The entitlement management module 108 may determine that the user is a member of the user group and may augment the effective entitlement 123 of the user with an entitlement associated with the user group. In some examples, the security module 110 may use the effective entitlement 123 of the user to perform a security action, such as generating a report that provide a unified view of effective entitlements across different content sources 208 or modifying an effective entitlement 123 for a user, which may update entitlements for a user in any associated ACLs for objects in content sources 208.

The systems and methods described herein are directed to managing user entitlements of information objects from different content sources. Conventional methods of entitlement management are often limited to a single content source or content sources that use the same permission model. The utilization of different content sources may require multiple systems to manage user entitlements. The added complexity of having multiple systems to manage user entitlements may lead to security vulnerabilities resulting from inaccurate or difficult to determine user entitlements. The systems and methods described herein are directed to determining effective user entitlements and providing a unified entitlement model across heterogeneous content sources.

Figure 5:
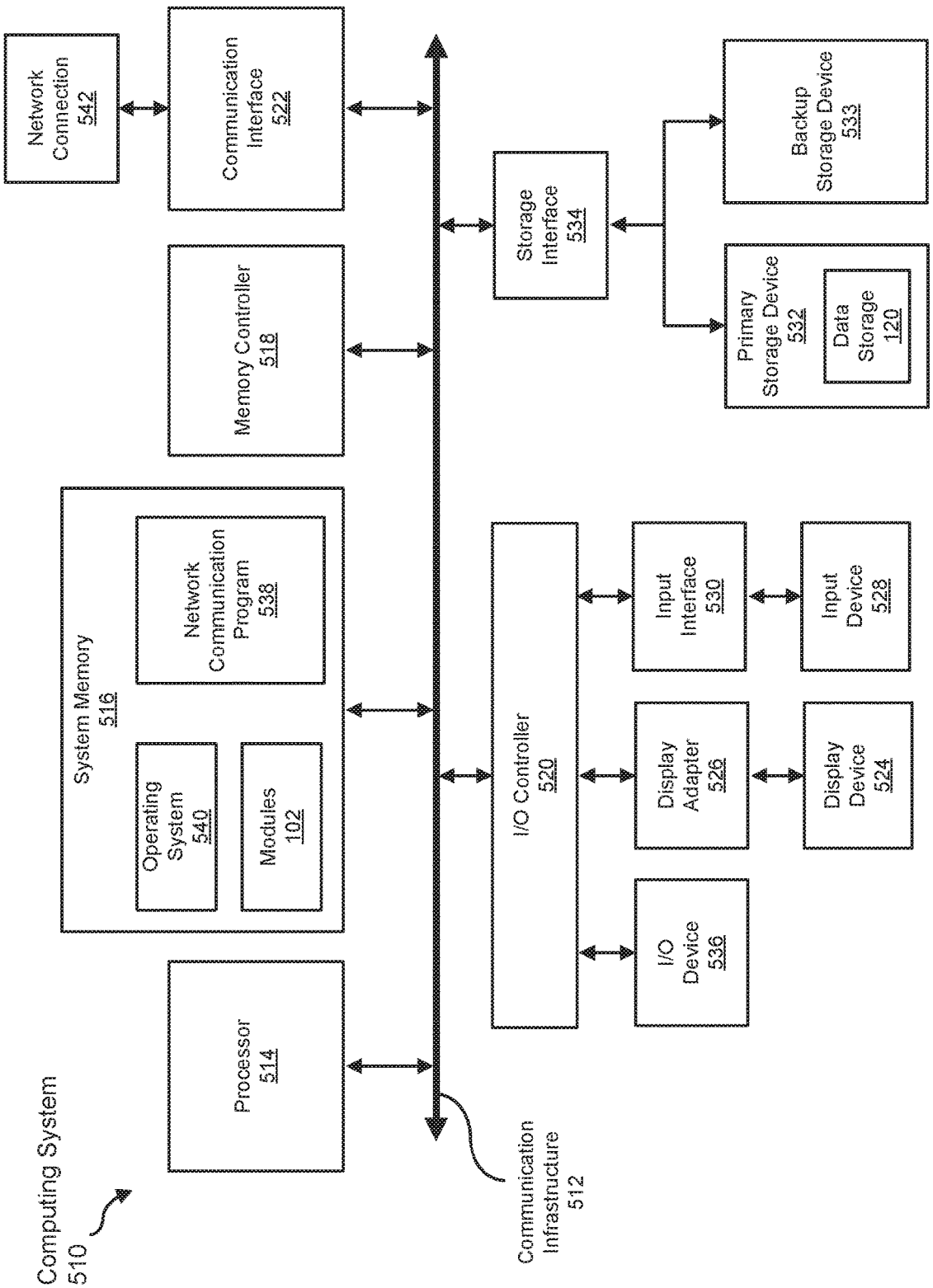
FIG. 5 is a block diagram of an example computing system capable of implementing one or more of the embodiments described and/or illustrated herein.

FIG. 5 is a block diagram of an example computing system 510 capable of implementing one or more of the embodiments described and/or illustrated herein. For example, all or a portion of the computing system 510 may perform and/or be a means for performing, either alone or in combination with other elements, one or more of the steps described herein (such as one or more of the steps illustrated in FIG. 3). All or a portion of the computing system 510 may also perform and/or be a means for performing any other steps, methods, or processes described and/or illustrated herein.

The computing system 510 broadly represents any single or multi-processor computing device or system capable of executing computer-readable instructions. Examples of the computing system 510 include, without limitation, workstations, laptops, client-side terminals, servers, distributed computing systems, handheld devices, or any other computing system or device. In its most basic configuration, the computing system 510 may include at least one processor 514 and a system memory 516.

The processor 514 generally represents any type or form of physical processing unit (e.g., a hardware-implemented central processing unit) capable of processing data or interpreting and executing instructions. In certain embodiments, the processor 514 may receive instructions from a software application or module. These instructions may cause the processor 514 to perform the functions of one or more of the example embodiments described and/or illustrated herein.

The system memory 516 generally represents any type or form of volatile or non-volatile storage device or medium capable of storing data and/or other computer-readable instructions. Examples of the system memory 516 include, without limitation, Random Access Memory (RAM), Read Only Memory (ROM), flash memory, or any other suitable memory device. Although not required, in certain embodiments, the computing system 510 may include both a volatile memory unit (such as, for example, the system memory 516) and a non-volatile storage device (such as, for example, the primary storage device 532, as described in detail below). In one example, one or more of the modules 102 from FIG. 1 may be loaded into the system memory 516.

In some examples, the system memory 516 may store and/or load an operating system 540 for execution by the processor 514. In one example, the operating system 540 may include and/or represent software that manages computer hardware and software resources and/or provides common services to computer programs and/or applications on the computing system 510. Examples of the operating system 540 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, the example computing system 510 may also include one or more components or elements in addition to the processor 514 and the system memory 516. For example, as illustrated in FIG. 5, the computing system 510 may include a memory controller 518, an Input/Output (I/O) controller 520, and a communication interface 522, each of which may be interconnected via a communication infrastructure 512. The communication infrastructure 512 generally represents any type or form of infrastructure capable of facilitating communication between one or more components of a computing device. Examples of the communication infrastructure 512 include, without limitation, a communication bus (such as an Industry Standard Architecture (ISA), Peripheral Component Interconnect (PCI), PCI Express (PCIe), or similar bus) and a network.

The memory controller 518 generally represents any type or form of device capable of handling memory or data or controlling communication between one or more components of the computing system 510. For example, in certain embodiments, the memory controller 518 may control communication between the processor 514, the system memory 516, and the I/O controller 520 via the communication infrastructure 512.

The I/O controller 520 generally represents any type or form of module capable of coordinating and/or controlling the input and output functions of a computing device. For example, in certain embodiments, the I/O controller 520 may control or facilitate transfer of data between one or more elements of the computing system 510, such as the processor 514, the system memory 516, the communication interface 522, the display adapter 526, the input interface 530, and the storage interface 534.

As illustrated in FIG. 5, the computing system 510 may also include at least one display device 524 coupled to the I/O controller 520 via a display adapter 526. The display device 524 generally represents any type or form of device capable of visually displaying information forwarded by the display adapter 526. Similarly, the display adapter 526 generally represents any type or form of device configured to forward graphics, text, and other data from the communication infrastructure 512 (or from a frame buffer, as known in the art) for display on the display device 524.

As illustrated in FIG. 5, the example computing system 510 may also include at least one input device 528 coupled to the I/O controller 520 via an input interface 530. The input device 528 generally represents any type or form of input device capable of providing input, either computer or human generated, to the example computing system 510. Examples of the input device 528 include, without limitation, a keyboard, a pointing device, a speech recognition device, variations or combinations of one or more of the same, and/or any other input device.

Additionally, or alternatively, the example computing system 510 may include additional I/O devices. For example, the example computing system 510 may include the I/O device 536. In this example, the I/O device 536 may include and/or represent a user interface that facilitates human interaction with the computing system 510. Examples of the I/O device 536 include, without limitation, a computer mouse, a keyboard, a monitor, a printer, a modem, a camera, a scanner, a microphone, a touchscreen device, variations or combinations of one or more of the same, and/or any other I/O device.

The communication interface 522 broadly represents any type or form of communication device or adapter capable of facilitating communication between the example computing system 510 and one or more additional devices. For example, in certain embodiments, the communication interface 522 may facilitate communication between the computing system 510 and a private or public network including additional computing systems. Examples of the communication interface 522 include, without limitation, a wired network interface (such as a network interface card), a wireless network interface (such as a wireless network interface card), a modem, and any other suitable interface. In at least one example, the communication interface 522 may provide a direct connection to a remote storage device via a direct link to a network, such as the Internet. The communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, the communication interface 522 may also represent a host adapter configured to facilitate communication between the computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. The communication interface 522 may also allow the computing system 510 to engage in distributed or remote computing. For example, the communication interface 522 may receive instructions from a remote device or send instructions to a remote device for execution.

In some examples, the system memory 516 may store and/or load a network communication program 538 for execution by the processor 514. In one example, the network communication program 538 may include and/or represent software that enables the computing system 510 to establish a network connection 542 with another computing system (not illustrated in FIG. 5) and/or communicate with the other computing system by way of the communication interface 522. In this example, the network communication program 538 may direct the flow of outgoing traffic that is sent to the other computing system via the network connection 542. Additionally or alternatively, the network communication program 538 may direct the processing of incoming traffic that is received from the other computing system via the network connection 542 in connection with the processor 514.

Although not illustrated in this way in FIG. 5, the network communication program 538 may alternatively be stored and/or loaded in the communication interface 522. For example, the network communication program 538 may include and/or represent at least a portion of software and/or firmware that is executed by a processor and/or Application Specific Integrated Circuit (ASIC) incorporated in the communication interface 522.

As illustrated in FIG. 5, the example computing system 510 may also include a primary storage device 532 and a backup storage device 533 coupled to the communication infrastructure 512 via a storage interface 534. The storage devices 532 and 533 generally represent any type or form of storage device or medium capable of storing data and/or other computer-readable instructions. For example, the storage devices 532 and 533 may be a magnetic disk drive (e.g., a so-called hard drive), a solid state drive, a floppy disk drive, a magnetic tape drive, an optical disk drive, a flash drive, or the like. The storage interface 534 generally represents any type or form of interface or device for transferring data between the storage devices 532 and 533 and other components of the computing system 510. In one example, the user profiles 121, the ACLs 122, and/or the effective entitlements 123 from FIG. 1 may be stored and/or loaded in the primary storage device 532.

In certain embodiments, the storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. The storage devices 532 and 533 may also include other similar structures or devices for allowing computer software, data, or other computer-readable instructions to be loaded into the computing system 510. For example, the storage devices 532 and 533 may be configured to read and write software, data, or other computer-readable information. The storage devices 532 and 533 may also be a part of the computing system 510 or may be a separate device accessed through other interface systems.

Many other devices or subsystems may be connected to the computing system 510. Conversely, all of the components and devices illustrated in FIG. 5 need not be present to practice the embodiments described and/or illustrated herein. The devices and subsystems referenced above may also be interconnected in different ways from that shown in FIG. 5. The computing system 510 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into the computing system 510. All or a portion of the computer program stored on the computer-readable medium may then be stored in the system memory 516 and/or various portions of the storage devices 532 and 533. When executed by the processor 514, a computer program loaded into the computing system 510 may cause the processor 514 to perform and/or be a means for performing the functions of one or more of the example embodiments described and/or illustrated herein. Additionally, or alternatively, one or more of the example embodiments described and/or illustrated herein may be implemented in firmware and/or hardware. For example, the computing system 510 may be configured as an Application Specific Integrated Circuit (ASIC) adapted to implement one or more of the example embodiments disclosed herein.

Figure 6:
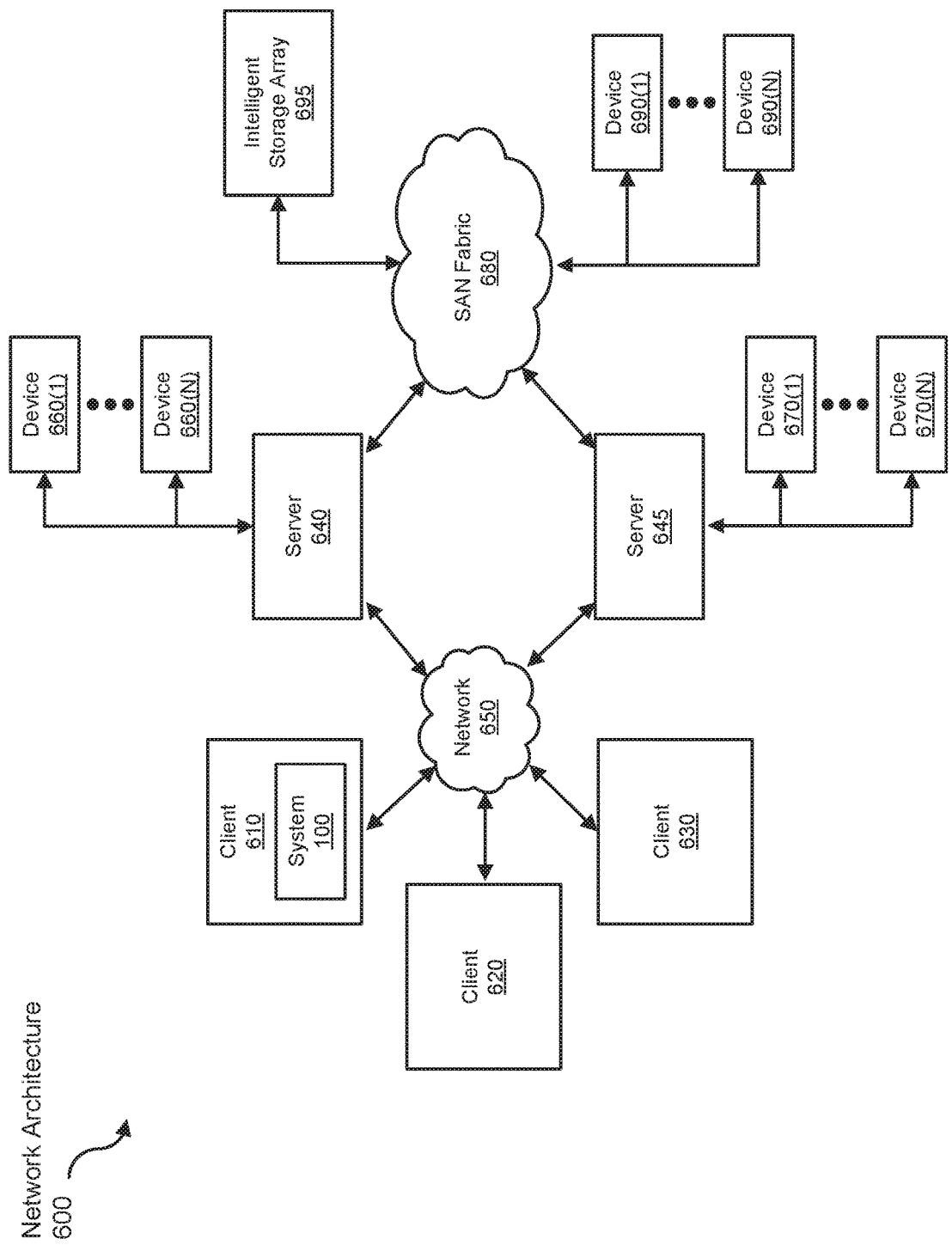
FIG. 6 is a block diagram of an example computing network capable of implementing one or more of the embodiments described and/or illustrated herein.

FIG. 6 is a block diagram of an example network architecture 600 in which client systems 610, 620, and 630 and servers 640 and 645 may be coupled to a network 650. As detailed above, all or a portion of the network architecture 600 may perform and/or be a means for performing, either alone or in combination with other elements, one or more of the steps disclosed herein (such as one or more of the steps illustrated in FIG. 3). All or a portion of the network architecture 600 may also be used to perform and/or be a means for performing other steps and features set forth in the instant disclosure.

The client systems 610, 620, and 630 generally represent any type or form of computing device or system, such as the example computing system 510 in FIG. 5. Similarly, the servers 640 and 645 generally represent computing devices or systems, such as application servers or database servers, configured to provide various database services and/or run certain software applications. The network 650 generally represents any telecommunication or computer network including, for example, an intranet, a WAN, a LAN, a PAN, or the Internet. In one example, the client systems 610, 620, and/or 630 and/or servers 640 and/or 645 may include all or a portion of the system 100 from FIG. 1.

As illustrated in FIG. 6, the one or more storage devices 660(1)-(N) may be directly attached to the server 640. Similarly, the one or more storage devices 670(1)-(N) may be directly attached to the server 645. The storage devices 660(1)-(N) and the storage devices 670(1)-(N) generally represent any type or form of storage device or medium capable of storing data and/or other computer-readable instructions. In certain embodiments, the storage devices 660(1)-(N) and the storage devices 670(1)-(N) may represent Network-Attached Storage (NAS) devices configured to communicate with the servers 640 and 645 using various protocols, such as Network File System (NFS), Server Message Block (SMB), or Common Internet File System (CIFS).

The servers 640 and 645 may also be connected to a Storage Area Network (SAN) fabric 680. The SAN fabric 680 generally represents any type or form of computer network or architecture capable of facilitating communication between a plurality of storage devices. The SAN fabric 680 may facilitate communication between the servers 640 and 645 and a plurality of the storage devices 690(1)-(N) and/or an intelligent storage array 695. The SAN fabric 680 may also facilitate, via the network 650 and the servers 640 and 645, communication between the client systems 610, 620, and 630 and the storage devices 690(1)-(N) and/or the intelligent storage array 695 in such a manner that the devices 690(1)-(N) and the array 695 appear as locally attached devices to the client systems 610, 620, and 630. As with the storage devices 660(1)-(N) and the storage devices 670(1)-(N), the storage devices 690(1)-(N) and the intelligent storage array 695 generally represent any type or form of storage device or medium capable of storing data and/or other computer-readable instructions.

In certain embodiments, and with reference to the example computing system 510 of FIG. 5, a communication interface, such as the communication interface 522 in FIG. 5, may be used to provide connectivity between each client system 610, 620, and 630 and the network 650. The client systems 610, 620, and 630 may be able to access information on the server 640 or 645 using, for example, a web browser or other client software. Such software may allow the client systems 610, 620, and 630 to access data hosted by the server 640, the server 645, the storage devices 660(1)-(N), the storage devices 670(1)-(N), the storage devices 690(1)-(N), or the intelligent storage array 695. Although FIG. 6 depicts the use of a network (such as the Internet) for exchanging data, the embodiments described and/or illustrated herein are not limited to the Internet or any particular network-based environment.

In at least one example, all or a portion of one or more of the example embodiments disclosed herein may be encoded as a computer program and loaded onto and executed by the server 640, the server 645, the storage devices 660(1)-(N), the storage devices 670(1)-(N), the storage devices 690(1)-(N), the intelligent storage array 695, or any combination thereof. All or a portion of one or more of the example embodiments disclosed herein may also be encoded as a computer program, stored in the server 640, run by the server 645, and distributed to the client systems 610, 620, and 630 over the network 650.

As detailed above, the computing system 510 and/or one or more components of the network architecture 600 may perform and/or be a means for performing, either alone or in combination with other elements, one or more steps of an example method for managing user entitlements of objects from heterogeneous content sources.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of the example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of the example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multitenant application for each customer such that one customer cannot access data and/or configuration information of another customer.

According to various embodiments, all or a portion of the example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally, or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of the example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of the example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of the example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of the example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally, or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:
1. A computer-implemented method for managing user entitlements of objects from heterogeneous content sources, at least a portion of the method being performed by a computing device comprising at least one processor, the method comprising:

obtaining, by the computing device, a user identifier from a user profile associated with a user;

determining, by the computing device, an entitlement for the user in an access control list (ACL) for an object of a content source;

determining, by the computing device, another entitlement for the user in another ACL for another object of another content source, wherein the content source and the other content source are associated with different systems;

generating, by the computing device, an effective entitlement of the user by associating the user identifier, the entitlement for the user in the ACL for the object, and the other entitlement for the user in the other ACL for the other object, wherein the effective entitlement is derived from deconstructing user groups and resolving conflicting entitlements associated with the user according to a conflict resolution rule that at last one of prioritizes directly assigned entitlements over group entitlements or prioritizes group entitlements over individual entitlements;

storing, by the computing device, the effective entitlement of the user;

performing, by the computing device, a security action using the effective entitlement of the user by modifying the effective entitlement and propagating changes in the effective entitlement to the ACL and the other ACL; and generating a report using the effective entitlement of the user.

2. The computer-implemented method of claim 1, further comprising:

identifying a user group in the ACL;

determining that the user is a member of the user group in the ACL; and determining a group entitlement for the object in the ACL.

3. The computer-implemented method of claim 2, wherein generating the effective entitlement of the user further comprises:

associating the user identifier with the group entitlement for the object.

4. The computer-implemented method of claim 3, wherein the conflict resolution rule prioritizes group entitlements over individual entitlements.

5. The computer-implemented method of claim 3, further comprising:

detecting that the user has been removed from the user group; and updating the effective entitlement of the user to remove the group entitlement.

6. The computer-implemented method of claim 3, further comprising:

detecting a change in the group entitlement; and updating the effective entitlement of the user to include the change in the group entitlement.

7. The computer-implemented method of claim 1, further comprising:

detecting a change of the entitlement for the user in in the ACL for the object; and updating the effective entitlement of the user to include the change of the entitlement.

8. The computer-implemented method of claim 1, further comprising:

normalizing the entitlement for the user of the ACL for the object of the content source to configured entitlements; and normalizing the other entitlement for the user in the other ACL for the other object of the other content source to the configured entitlements.

9. The computer-implemented method of claim 1, further comprising:

performing a security action using the effective entitlement of the user.

10. A system for managing user entitlements of objects from heterogeneous content sources, the system comprising:

at last one physical processor;

physical memory comprising computer-executable instructions that, when executed by the physical processor, cause the physical processor to:

obtain a user identifier from a user profile associated with a user;

determine an entitlement for the user in an access control list (ACL) for an object of a content source;

determine another entitlement for the user in another ACL for another object of another content source, wherein the content source and the other content source are associated with different systems;

generate an effective entitlement of the user by associating the user identifier, the entitlement for the user in the ACL for the object, and the other entitlement for the user in the other ACL for the other object, wherein the effective entitlement is derived from deconstructing user groups and resolving conflicting entitlements associated with the user according to a conflict resolution rue that at last one of prioritizes directly assigned entitlements over group entitlements or prioritizes group entitlements over individual entitlements;

store the effective entitlement of the user;

perform a security action using the effective entitlement of the user by modifying the effective entitlement and propagating changes in the effective entitlement to the ACL and the other ACL; and generate a report using the effective entitlement of the user.

11. The system of claim 10, wherein the computer-executable instructions further cause the physical processor to:

identify a user group in the ACL;

determine that the user is a member of the user group in the ACL; and determine a group entitlement for the object in the ACL.

12. The system of claim 11, wherein, to generate the effective entitlement of the user, the computer-executable instructions further cause the physical processor to:

associate the user identifier with the group entitlement for the object.

13. The system of claim 12, wherein the conflict resolution rule prioritizes directly assigned entitlements over group entitlements conflict resolution rule that at least one of prioritizes directly assigned entitlements over group entitlements or prioritizes group entitlements over individual entitlements.

14. The system of claim 12, wherein the computer-executable instructions further cause the physical processor to:

detect that the user has been removed from the user group; and update the effective entitlement of the user to remove the group entitlement.

15. The system of claim 12, wherein the computer-executable instructions further cause the physical processor to:
detect a change in the group entitlement; and
update the effective entitlement of the user to include the change in the group entitlement.

16. The system of claim 10, wherein the computer-executable instructions further cause the physical processor to:
detect a change of the entitlement for the user in in the ACL for the object; and
update the effective entitlement of the user to include the change of the entitlement.

17. The system of claim 10, wherein the computer-executable instructions further cause the physical processor to:
normalize the entitlement for the user of the ACL for the object of the content source to configured entitlements; and
normalize the other entitlement for the user in the other ACL for the other object of the other content source to the configured entitlements.

18. The system of claim 10, wherein the computer-executable instructions further cause the physical processor to:
perform a security action using the effective entitlement of the user.

19. A non-transitory computer-readable medium comprising one or more computer-executable instructions that, when executed by at last one processor of a computing device, cause the computing device to:
obtain a user identifier from a user profile associated with a user;
determine an entitlement for the user in an access control list (ACL) for an object of a content source;
determine another entitlement for the user in another ACL for another object of another content source, wherein the content source and the other content source are associated with different systems;
generate an effective entitlement of the user by associating the user identifier, the entitlement for the user in the ACL for the object, and the other entitlement for the user in the other ACL for the other object, wherein the effective entitlement is derived from deconstructing user groups and resolving conflicting entitlements associated with the user according to a conflict resolution rue that at last one of prioritizes directly assigned entitlements over group entitlements or prioritizes group entitlements over individual entitlements;
store the effective entitlement of the user;
perform a security action using the effective entitlement of the user by modifying the effective entitlement and propagating changes in the effective entitlement to the ACL and the other ACL; and
generate a report using the effective entitlement of the user.

* * * * *

UNITED STATES PATENT AND TRADEMARK OFFICE
CERTIFICATE OF CORRECTION

PATENT NO. : 11,070,560 B1
APPLICATION NO. : 16/374409
DATED : July 20, 2021
INVENTOR(S) : Shailesh Dargude et al.

It is certified that error appears in the above-identified patent and that said Letters Patent is hereby corrected as shown below:

In the Claims

In Column 19, Line 21, Claim 1, after "at" delete "last" and insert -- least --, therefor.

In Column 20, Line 13, Claim 10, after "at" delete "last" and insert -- least --, therefor.

In Column 20, Line 32, Claim 10, after "resolution" delete "rue" and insert -- rule --, therefor.

In Column 20, Line 32, Claim 10, after "at" delete "last" and insert -- least --, therefor.

In Column 22, Line 3, Claim 19, after "at" delete "last" and insert -- least --, therefor.

In Column 22, Line 20, Claim 19, after "resolution" delete "rue" and insert -- rule --, therefor.

In Column 22, Line 20, Claim 19, after "at" delete "last" and insert -- least --, therefor.

Signed and Sealed this
Thirty-first Day of August, 2021

Drew Hirshfeld
*Performing the Functions and Duties of the
Under Secretary of Commerce for Intellectual Property and
Director of the United States Patent and Trademark Office*